(12) United States Patent
Astely et al.

(10) Patent No.: US 8,477,666 B2
(45) Date of Patent: Jul. 2, 2013

(54) METHOD AND ARRANGEMENT IN A TELECOMMUNICATION SYSTEM WITH SIGNALLING OF ASSIGNED DATA PACKETS IN A BUNDLING WINDOW

(75) Inventors: David Astely, Bromma (SE); Tobias Rydén, Täby (SE); Yang Hu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 195 days.

(21) Appl. No.: 12/989,994

(22) PCT Filed: Oct. 3, 2008

(86) PCT No.: PCT/SE2008/051123
§ 371 (c)(1),
(2), (4) Date: Oct. 28, 2010

(87) PCT Pub. No.: WO2009/134179
PCT Pub. Date: Nov. 5, 2009

(65) Prior Publication Data
US 2011/0044278 A1    Feb. 24, 2011

Related U.S. Application Data

(60) Provisional application No. 61/048,320, filed on Apr. 28, 2008.

(51) Int. Cl.
*H04W 72/12* (2009.01)
*H04J 3/00* (2006.01)
*H04J 3/16* (2006.01)

(52) U.S. Cl.
USPC ........... 370/280; 370/329; 370/437; 370/252; 455/450

(58) Field of Classification Search
USPC ................ 370/236, 252, 328, 329, 338, 335, 370/336, 342–343; 455/450, 452.1
See application file for complete search history.

(56) References Cited

U.S. PATENT DOCUMENTS 7,433,329 B2 * 10/2008 Qian .............................. 370/310
7,460,524 B2 * 12/2008 Khan ............................ 370/353

(Continued)

FOREIGN PATENT DOCUMENTS

WO    WO/2007/065272 A    6/2007

OTHER PUBLICATIONS

Ericsson: "Details of ACK/NAK bundling for TDD" 3GPP Draft; RI-082002, 3rd Generation Partnership Project (3GPP), Mobile Competence Centre ; 650, Route Des Lucioles ; F-06921 Sophia-Antipolis Cedex ; France, vol. tsg_ran\WG1_RL1\TSGR1_53\Docs, no. Kansas City, USA; 20080505, May 5-9, 2008 XP050110349 the whole document.

(Continued)

*Primary Examiner* — Candal Elpenord

(57) ABSTRACT

A method for sending a data packet from a base station to a mobile terminal includes signalling to the mobile terminal in a first subframe of a radio channel a first downlink assignment of a first data packet of a bundling window. The bundling window represents a number of data packets, already transmitted or to be transmitted to the mobile terminal, that are to be confirmed by the mobile terminal. The downlink assignment represents information about a minimum total number of data packets within the bundling window that are scheduled to be transmitted to the mobile terminal. The method also includes transmitting data packets from a base station in subframes of the radio channel using the bundling window.

19 Claims, 6 Drawing Sheets

U.S. PATENT DOCUMENTS

| | | | | |
|---|---|---|---|---|
| 7,787,412 B2* | 8/2010 | Vadgama et al. | ............ | 370/320 |
| 2004/0147257 A1* | 7/2004 | Phillips et al. | ............... | 455/427 |
| 2004/0264420 A1* | 12/2004 | Qian et al. | .................... | 370/335 |
| 2007/0060192 A1* | 3/2007 | Morimoto et al. | ........... | 455/525 |
| 2008/0273513 A1* | 11/2008 | Montojo et al. | ............. | 370/342 |
| 2009/0080369 A1* | 3/2009 | Uminski et al. | ............. | 370/328 |
| 2009/0129259 A1* | 5/2009 | Malladi et al. | ................ | 370/210 |
| 2009/0185122 A1* | 7/2009 | Takahashi et al. | ........... | 349/122 |
| 2009/0225700 A1* | 9/2009 | Shen et al. | ................... | 370/328 |
| 2009/0258408 A1* | 10/2009 | Perry | ........................ | 435/252.1 |
| 2009/0323617 A1* | 12/2009 | Che et al. | ..................... | 370/329 |

OTHER PUBLICATIONS

Ericsson: "Details of ACK/NAK bundling for TDD" 3GPP Draft; R1-081528,3rd Generation 'Partnership Project (3GPP), Mobile Competence Centre ; 650, Route Des Lucioles ; F-06921 Sophia-Antipoliscedex ; France, vol. tsg_ran\WG1_RL1\TSGR1_52b\Docs, no. ' :Shenzhen, China; 20080331, Mar. 31-Apr. 4, 2008 XP050109942 Y sections 2.3.1, 2.3.3.

LG Electronics: "Handling problem with uplink ACK/NACK bundling". 3GPP TSG RAN WG1 #52bis. R1-081256, Mar. 31-Apr. 4, 2008. Shenzhen, China.

* cited by examiner

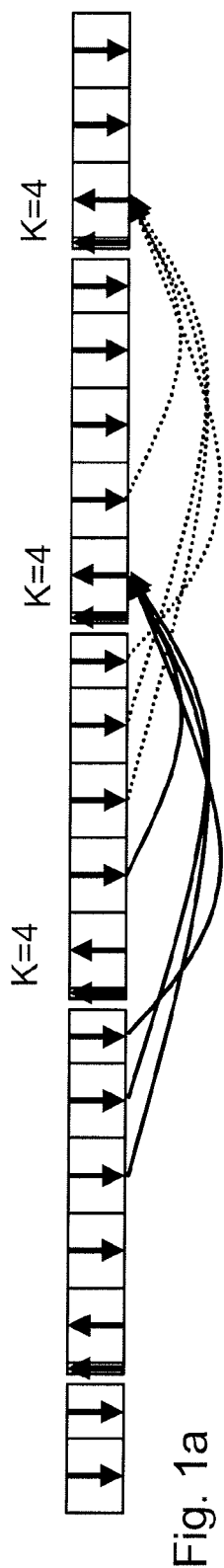 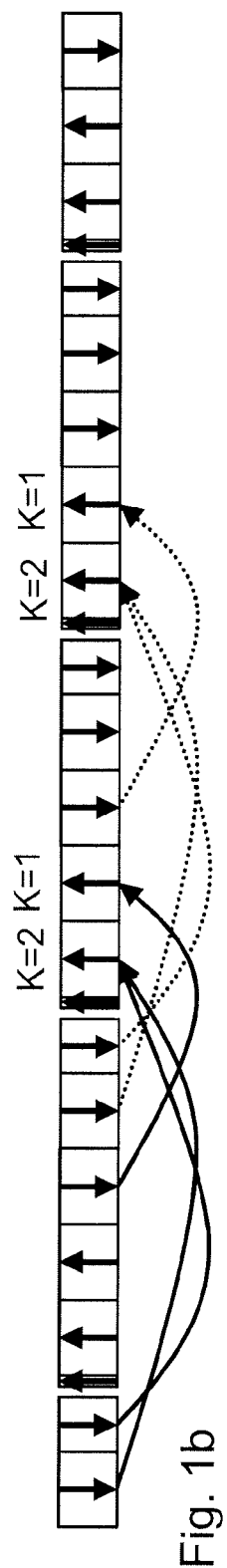 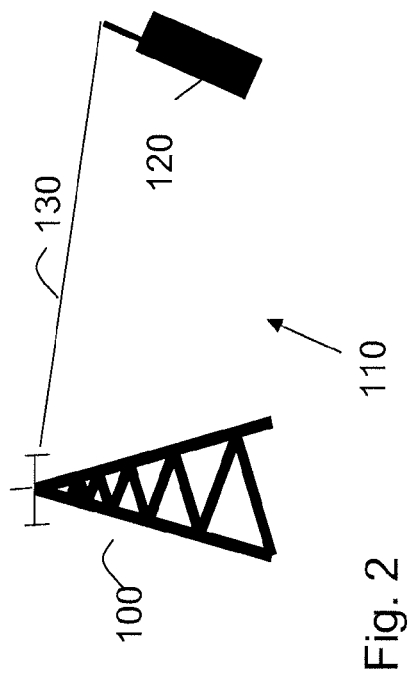
Fig. 1a
Fig. 1b
Fig. 2

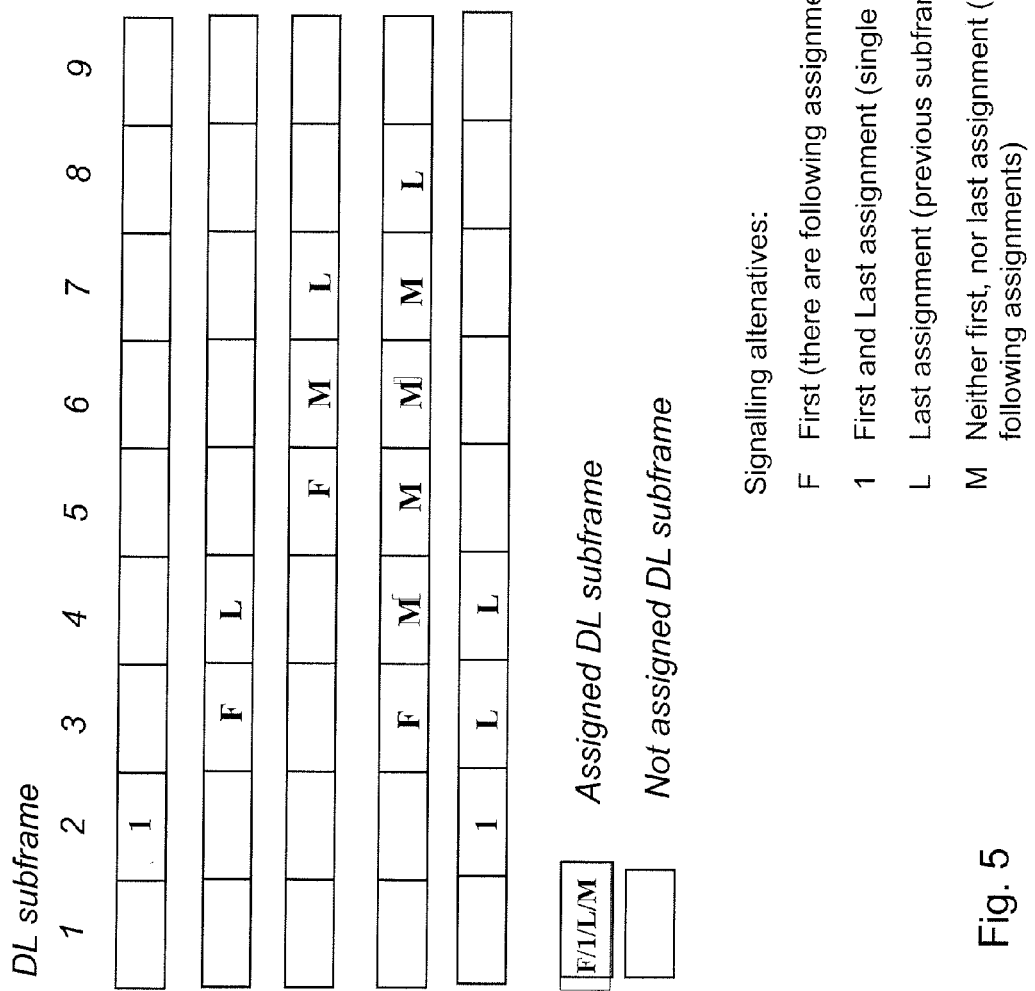

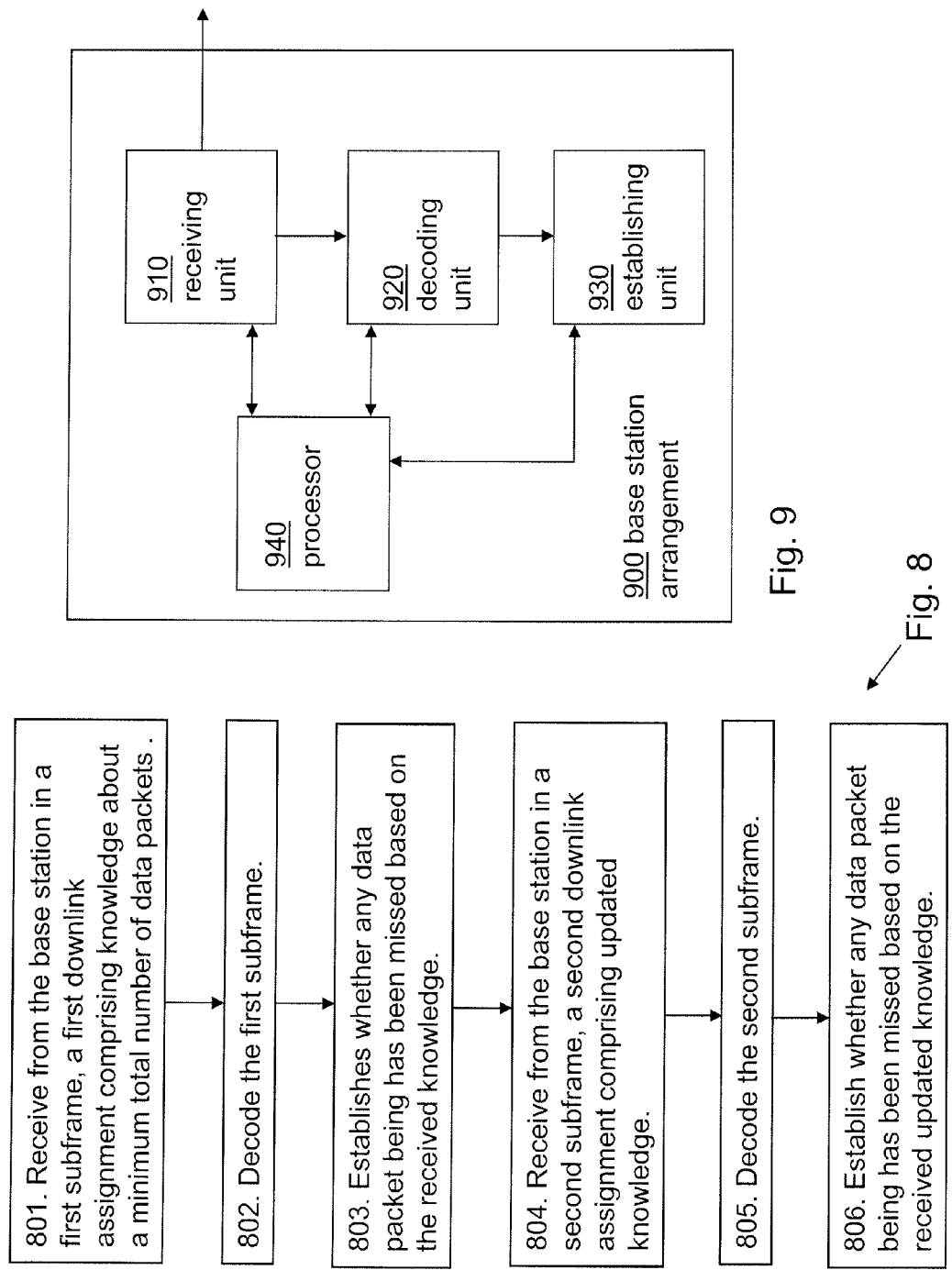

METHOD AND ARRANGEMENT IN A TELECOMMUNICATION SYSTEM WITH SIGNALLING OF ASSIGNED DATA PACKETS IN A BUNDLING WINDOW

This application claims the benefit of U.S. Provisional Application No. 61/048320, filed Apr. 28, 2008, the disclosure of which is fully incorporated herein by reference.

TECHNICAL FIELD

The present invention relates to a method and an arrangement in a base station and a method and an arrangement in a mobile terminal. In particular, it relates to downlink assignment.

BACKGROUND

A key requirement on Long Term Evolution (LTE) in 3GPP Wireless Communications Systems is frequency flexibility for transmissions between a radio base station and a mobile terminal over a radio link. For this purpose, carrier bandwidths between 1.4 MHz and 20 MHz are supported, as is both Frequency Division Duplex (FDD) and Time Division Duplex (TDD), so that both paired and unpaired frequency spectrum can be used. For FDD, the downlink, i.e. the link from a base station to a mobile terminal, and uplink, i.e. the link from a mobile terminal to a base station, use different frequencies so called "paired frequency spectrum" and can hence transmit simultaneously. For TDD, uplink and downlink use the same frequency "unpaired" frequency spectrum" and can not transmit simultaneously. Uplink and downlink can however share the time in a flexible way, and by allocating different amounts of time, such as the number of subframes of a radio frame, to uplink and downlink, it is possible to adapt to asymmetric traffic and resource needs in uplink and downlink.

The above asymmetry also leads to a significant difference between FDD and TDD. Whereas for FDD, the same number of uplink and downlink subframes is available during a radio frame, for TDD the number of uplink and downlink subframes may be different. In LTE time is structured into radio frames of 10 ms duration, and each radio frame is further divided into 10 subframes of 1 ms each. One of many consequences of this is that in FDD, a mobile terminal can always send feedback in response to a data packet in an uplink subframe subject to a certain fixed processing delay. In other words, every downlink subframe can be associated to a specific later uplink subframe for feedback generation in way that this association is one-to-one, i.e. to each uplink subframe is associated exactly one downlink subframe. For TDD however, since the number of uplink and downlink subframes during a radio frame may be different, it is in general not possible to construct a such one-to-one association. For the typical case with more downlink subframes than uplink subframes, it is rather so that feedback from several downlink subframes requires to be transmitted in each uplink subframe.

In Evolved Universal Terrestrial Radio Access Network (E-UTRAN), a radio frame of 10 ms duration is divided into ten subframes, wherein each subframe is 1 ms long. In case of TDD, a subframe is either assigned to uplink or downlink, i.e., uplink and downlink transmission cannot occur at the same time. Furthermore, each 10 ms radio frame is divided into two half-frames of 5 ms duration where each half-frame consists of five subframes.

The first subframe of a radio frame is always allocated to downlink transmission. The second subframe is split into three special fields, Downlink Pilot Time Slot (DwPTS), Guard Period (GP) and Uplink Pilot Time Slot (UpPTS), with a total duration of 1 ms.

UpPTS is used for uplink transmission of sounding reference signals and, if so configured, reception of a shorter random access preamble. No data or control signalling can be transmitted in UpPTS.

GP is used to create a guard period between periods of downlink and uplink subframes and may be configured to have different lengths in order to avoid interference between uplink and downlink transmissions and is typically chosen based on the supported cell radius.

DwPTS is used for downlink transmission much like any other downlink subframe with the difference that it has shorter duration.

Different allocations of the remaining subframes to uplink and downlink transmission are supported, both allocations with 5 ms periodicity in which the first and second half-frame have identical structure, and allocations with 10 ms periodicity for which the half-frames are organized differently. For certain configurations the entire second half-frame is assigned to downlink transmission. Currently supported configurations use 5 ms and 10 ms periodicity. In case of 5 ms periodicity, the ratio between downlink and uplink may e.g. be 2/3, 3/2, 4/1, etc. In case of 10 ms periodicity, the ratio between downlink and uplink may e.g. be 5/5, 7/3, 8/2, 9/1 etc.

In the downlink of E-UTRAN, OFDM with a subcarrier spacing of 15 kHz is used. In the frequency dimension the subcarriers are grouped into resource blocks, each containing twelve consecutive subcarriers. The number of resource blocks depends on the system bandwidth, and the minimum bandwidth corresponds to six resource blocks. Depending on the configured cyclic prefix length, a 1 ms subframe contains either 12 or 14 OFDM symbols in time. The term resource block is also used to refer to the two-dimensional structure of all OFDM symbols within a half subframe, times a resource block of subcarriers. The special downlink subframe DwPTS has a variable duration, and can assume lengths of 3, 9, 10, 11 or 12 OFDM symbols for the case with normal cyclic prefix, and 3, 8, 9 or 10 symbols for the case with extended cyclic prefix.

In the uplink of E-UTRAN, SC-FDMA, also referred to as DFT-pre-coded OFDM is used. The underlying two-dimensional (time and frequency) numerology is the same in terms of subcarrier spacing, cyclic prefix lengths and number of OFDM symbols. The major difference is that modulated data symbols to be transmitted in certain OFDM symbols are subject to a DFT and the outputs of the DFT are mapped to the subcarriers.

In order to improve performance of transmission in both the downlink and uplink direction, LTE uses Hybrid Automatic Repeat Request (HARQ). We will here discuss the function of this mechanism for downlink transmission. The basic idea of HARQ is that after receiving data in a downlink subframe the terminal attempts to decode it and then reports to the base station whether the decoding was successful (ACK, acknowledgement) or not (NAK, negative acknowledgement). In case of an unsuccessful decoding attempt the base station thus receives a NAK in a later uplink subframe, and can retransmit the erroneously received data.

Downlink transmissions are dynamically scheduled, i.e. in each subframe the base station transmits control information on which terminals are to receive data and upon which resources in the current downlink subframe. Such a control information message to a terminal is referred to as a downlink assignment. A downlink assignment thus contains information to the terminal about in which resources a subsequent data will be sent, and also information necessary for the terminal to decode the subsequent data, such as modulation and coding scheme. By resources is here meant some set of resource blocks. This control signalling is transmitted in the first 1, 2 or 3 OFDM symbols in each subframe. The data sent to a terminal in a single downlink subframe is often referred to a transport block.

A terminal will thus listen to the control channel, and if it detects a downlink assignment addressed to itself, it will try to decode the subsequent data. It will also generate feedback in response to the transmission, in the form of an ACK or a NAK depending on whether the data was decoded correctly or not. Furthermore, from the control channel resources on which the assignment was transmitted by the base station, the terminal can determine the corresponding uplink control channel resource.

For E-UTRAN FDD the terminal will in response to a detected downlink assignment in subframe n, send an ACK/NAK report in uplink subframe n+4. For the case with so-called Multiple In Multiple Out (MIMO) multi-layer transmission, two transport blocks are transmitted in a single downlink subframe, and the terminal will respond with two ACK/NAK reports in the corresponding uplink subframe.

The assignment of resources to the terminals is handled by the scheduler, which takes into account traffic and radio conditions so as to use the resources efficiently while also meeting delay and rate requirements. Scheduling and control signaling may be done on a subframe to subframe basis. Currently there is no dependency between the downlink assignments sent in the different downlink subframes, i.e. each downlink subframe is scheduled independently of others.

As described above, the first step for a terminal to receive data from the base station in a downlink subframe is to detect a downlink assignment in the control field of a downlink subframe. In the case that the base station sends such an assignment but the terminal fails to decode it, the terminal obviously cannot know that is was scheduled and will hence not respond with an ACK/NAK in the uplink. This situation is referred to as a missed downlink assignment. If the absence of an ACK/NAK can be detected by the base station, it can take this into account for subsequent retransmissions. Typically the base station should at least retransmit the missing packet, but it may also adjust some other transmission parameters.

For FDD a terminal can always respond to a downlink data transmission with an ACK/NAK after a fixed delay of 4 subframes, while for TDD there is not a one-to-one relation between uplink and downlink subframes. This was discussed above. Thus the terminal cannot always send an ACK/NAK in response to a downlink assignment in subframe n in uplink subframe n+4, since this subframe may not be allocated to uplink transmission. Hence each downlink subframe may be associated with a certain uplink subframe subject to a minimum processing delay, meaning that ACK/NAKs in response to downlink assignments in subframe n are reported in subframe n+k with k>3. Furthermore, if the number of downlink subframes is larger than the number of uplink subframes, ACK/NAKs in response to assignments in multiple downlink subframes may need to be sent in a single uplink subframe. For a given uplink subframe, the number of associated downlink subframes depends on the configuration of subframes to uplink and downlink, and can be different for different uplink subframes.

Since downlink assignments can be given independently across downlink subframes, a terminal may be assigned downlink transmissions in multiple downlink subframes that are all to be acknowledged in a single uplink subframe. Hence the uplink control signaling needs to support, in some way, feedback of ACK/NAKs from multiple downlink transmissions from a terminal in a given uplink subframe.

One obvious way to approach the above problem is to allow the terminal to transmit multiple individual (for each downlink transmission) ACK/NAK bits in a single uplink subframe. Such protocols have however worse coverage than transmission of a one or two ACK/NAK reports. In addition, the more ACK/NAKs that are allowed to be transmitted from a single terminal, the more control channel resources need to be reserved in the uplink. To improve control signaling coverage and capacity, it is possible to perform some form of compression, or bundling, of ACK/NAKs. This means that all ACK/NAKs that are to be sent in a given uplink subframe are combined into a smaller number of bits, such as a single ACK/NAK report. As an example, the terminal can transmit an ACK only if the transport blocks of all the downlink subframes were received correctly and hence to be acknowledged. In any other case, meaning that at a NAK for at least one downlink subframe is to be transmitted, a combined NAK is sent for all downlink subframes. As described above, to each uplink subframe in TDD a set of downlink subframes can be associated rather than a single subframe as in FDD, for which downlink transmissions are to be given ACK/NAK response in the given uplink subframe. In the context of bundling this set is often referred to as the bundling window.

FIG. 1a and FIG. 1b illustrates two different uplink (UL): downlink (DL) allocations as an example for how bundling windows are used. Uplink subframes contains an upward directed arrow, downlink subframes contains an downward directed arrow, and DwPTS, GP UpPTS subframes comprises both a downward directed arrow and an upward directed arrow in FIGS. 1a and b. In the examples, the number of associated downlink subframes, K, is different for different subframes as well as for different asymmetries. For the 4DL: 1UL configuration in FIG. 1a, the uplink subframe in each half frame is associated to four downlink subframes (K=4). For the 3DL: 2UL configuration in FIG. 1b, the first uplink subframe in each half frame is associated to two downlink subframes (K=2), while the second is associated with a single DL subframe (K=1).

Another advantage of bundling is that it allows reusing the same control channel signaling formats as for FDD, independently of the TDD uplink/downlink asymmetry. The disadvantage is a loss in downlink efficiency. If the base station receives a NAK it cannot know how many and which downlink subframes were received erroneously and which were received correctly. Hence it may need to retransmit all of them.

A problem with ACK/NAK bundling is that a terminal may miss a downlink assignment, which may not be indicated in the bundled response. For instance, assume that the terminal was scheduled in two consecutive downlink subframes. In the first subframe the terminal misses the scheduling downlink assignment and will not be aware that it was scheduled, while in the second subframe it did successfully receive the data. The terminal will, as a result, transmit an ACK, which the base station will assume holds for both subframes, including data in subframe the terminal was not aware of. As a result, data will be lost. The lost data needs to be handled by higher-layer protocols, which typically takes a longer time than HARQ retransmissions and is less efficient. In fact, a terminal will not transmit any ACK/NAK in a given uplink subframe only if it missed every downlink assignment that was sent during the bundling window associated with the uplink subframe.

Thus, a missed downlink assignment will in general result in block errors that need to be corrected by higher-layer protocols, which in turn has a negative impact on performance in terms of throughput and latency. Also, increasing the delay may cause undesirable interactions with TCP based applications.

SUMMARY

It is therefore an object of the present invention to provide a mechanism for improving the detection of missed downlink assignment.

According to a first aspect of the present invention, the object is achieved by a method in a base station for sending a data packet to a mobile terminal. The base station uses a current bundling window for transmitting data packets in subframes of a radio channel. The bundling window comprises a number of data packets, already transmitted or to be transmitted to the mobile terminal. The data packets are to be confirmed by the mobile terminal. In a first subframe, the base station signals to the mobile terminal, a first downlink assignment of a first data packet of the bundling window. The downlink assignment comprises knowledge about a minimum total number of data packets within the bundling window that are scheduled to be transmitted to the mobile terminal.

According to a second aspect of the present invention, the object is achieved by a method in a mobile terminal for receiving a data packet from a base station. The base station uses a current bundling window for transmitting data packets. The bundling window comprises a number of data packets, transmitted or to be transmitted to the mobile terminal. The data packets are to be confirmed by the mobile terminal. The mobile terminal receives in a first subframe, a signal from the base station. The signal comprises a first downlink assignment of a first data packet of the bundling window. The downlink assignment comprises knowledge about a minimum total number of data packets within the bundling window that are scheduled to be transmitted to the mobile terminal. The mobile terminal decodes the first subframe. Based on the received knowledge, the mobile terminal establishes whether any data packet being scheduled in the bundling window and being sent from the base station before the first downlink assignment, has been missed.

According to a third aspect of the present invention, the object is achieved by an arrangement in a base station for sending a data packet to a mobile terminal. The base station is configured to use a current bundling window for transmitting data packets in subframes of a radio channel. The bundling window comprises a number of data packets, already transmitted or to be transmitted to the mobile terminal. The data packets are to be confirmed by the mobile terminal. The base station arrangement comprises a signalling unit configured to, signal to the mobile terminal in a first subframe, a first downlink assignment of a first data packet of the bundling window. The downlink assignment comprises knowledge about a minimum total number of data packets within the bundling window that are scheduled to be transmitted to the mobile terminal.

According to a fourth aspect of the present invention, the object is achieved by an arrangement in a mobile terminal for receiving a data packet from a base station. The base station is configured to use a current bundling window for transmitting data packets. The bundling window comprises a number of data packets, transmitted or to be transmitted to the mobile terminal, and to be confirmed by the mobile terminal. The mobile terminal arrangement comprises a receiving unit configured to receive in a first subframe, a signal from the base station. The signal comprises a first downlink assignment of a first data packet of the bundling window. The downlink assignment comprises knowledge about a minimum total number of data packets within the bundling window that are scheduled to be transmitted to the mobile terminal. The mobile terminal arrangement comprises a decoding unit configured to decode the first subframe. The mobile terminal arrangement further comprises an establishing unit configured to establish whether any data packet being scheduled in the bundling window and being sent from the base station before the first downlink assignment has been missed. The establishment is based on the received knowledge.

If the mobile terminal misses the last downlink assignment sent within a bundling window, it will notice this since previous signalled downlink assignments comprises knowledge about a minimum total number of data packets within the bundling window that are scheduled to be transmitted to the mobile terminal which have indicated that more assignments should come later within the bundling window. I.e. the detection of missed downlink assignment is improved.

If the mobile terminal misses (fails to detect) one or more downlink assignments within a bundling window, it will be able to determine this by looking at the assignments it did detect. Only if a terminal misses every downlink assignment within a bundling window, the miss(es) will go by unnoticed.

BRIEF DESCRIPTION OF THE DRAWINGS

The invention is described in more detail with reference to attached drawings illustrating exemplary embodiments of the invention and in which:

FIG. 1a is a schematic block diagram illustrating association of downlink subframes with an uplink subframe for an uplink/downlink allocation according to prior art.

FIG. 1b is a schematic block diagram illustrating association of downlink subframes with an uplink subframe for another uplink/downlink allocation according to prior art.

FIG. 2 is a schematic block diagram illustrating embodiments of a wireless telecommunication system.

FIG. 5 is a schematic block diagram illustrating embodiments of signalling.

FIG. 8 is a flow chart illustrating embodiments of a method in a mobile terminal.

FIG. 9 is a schematic block diagram illustrating embodiments of a mobile terminal arrangement.

DETAILED DESCRIPTION

Figure 3:
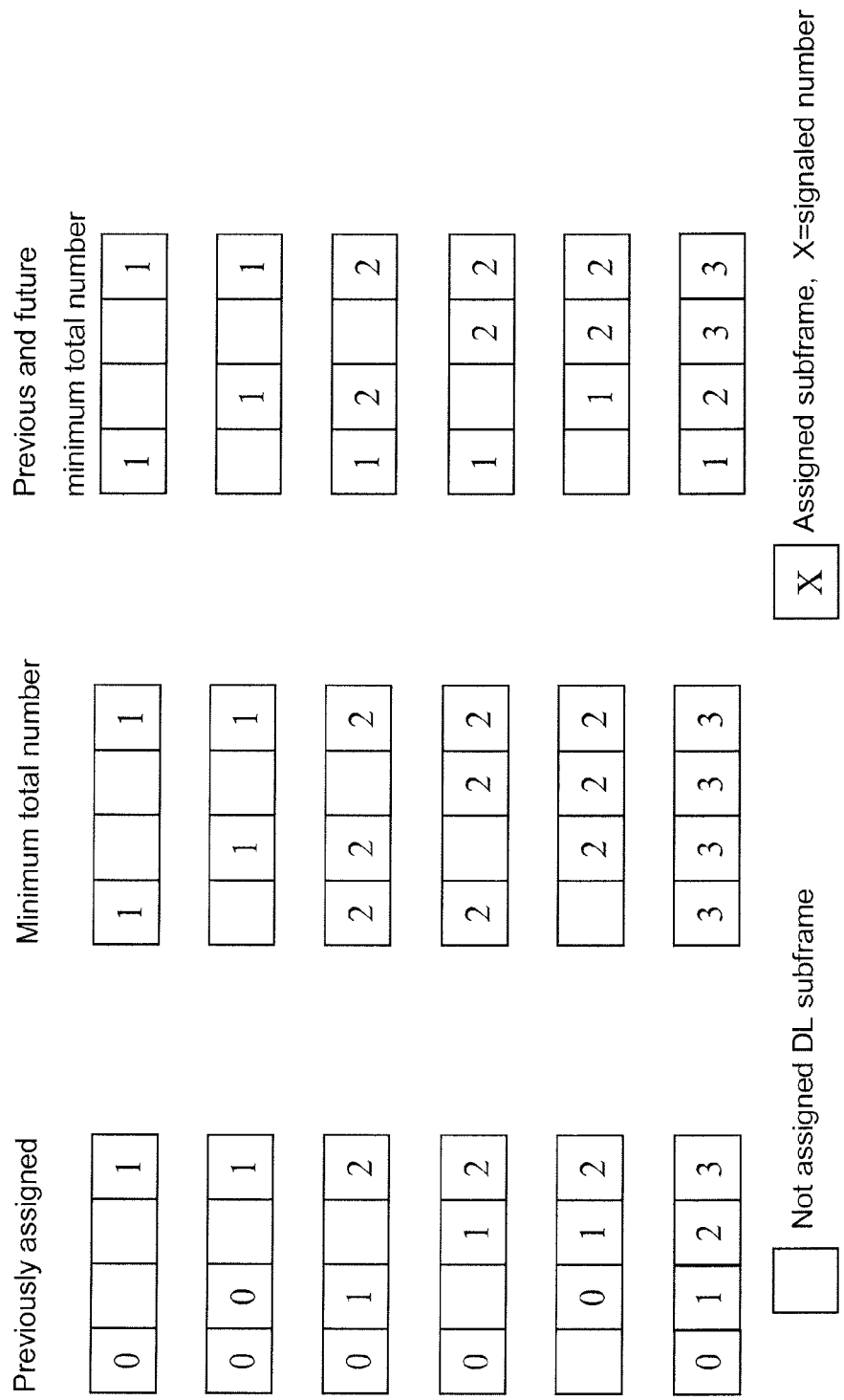
FIG. 3 is a schematic block diagram illustrating embodiments of signalling.

Briefly described the present solution may be summarized in the following way: A base station, when sending a data packet comprised in a bundling window to a mobile terminal, at the same time provides knowledge, i.e. information to the mobile terminal about a minimum total number of data packets within a bundling window that are scheduled to be transmitted to the mobile terminal. In that way the mobile terminal can establish whether a data packet transmitted from the bundling window is received and detected or not.

The invention is defined as a method and an arrangement which may be put into practice in the embodiments described below.

FIG. 2 depicts a wireless telecommunication system 100, such as the E-UTRAN, also known as LTE, 3rd Generation Partnership Project (3GPP) WCDMA system or Global System for Mobile communications/Enhanced Data rate for GSM Evolution (GSM/EDGE). The telecommunication system 100 uses TDD and comprises a base station 110 and a mobile terminal 120 adapted to communicate with each other over a TDD radio channel 130. The base station 110 may be a NodeB, an eNodeB or any other network unit capable to communicate with a mobile terminal over a radio channel using TDD. The mobile terminal 120 may be a mobile phone, a Personal Digital Assistant (PDA), a user equipment (UE) or any other network unit capable to communicate with a base station over a radio channel using TDD.

The base station 110 uses HARQ and ACK/NAK bundling for transmitting data packets in subframes of a radio channel. Within each bundling window there are a number of data packets to be transmitted to the mobile terminal 120. These packets are stored in a buffer in the base station, and then transmitted one by one to the mobile terminal 120. A packet is not removed from the buffer until the base station 110 has received an acknowledgement that the mobile terminal 120 has correctly detected and decoded the specific data packet, or a maximum number of retransmissions are performed, or a predetermined time period has lapsed. If no acknowledgement is received from the mobile terminal 120, the base station 110 retransmits the non-acknowledged data packets until they have been acknowledged by the mobile terminal 120 or until a pre-determined period expires, and then deletes the data packets.

To improve the possibility to detect a missed DL assignment, the base station 110 signals, e.g. as part of a scheduling command, to the mobile terminal 120, knowledge about the minimum total number of downlink assignments, that the mobile terminal 120, will be assigned within the current bundling window. Often, the base station 110 does not know the total number of data packets within the bundling window to be transmitted to the mobile terminal 120, when starting the signaling of the downlink assignments of the packets within the bundling window, therefore the total minimum number, i.e. the number of data packets within the bundling window known so far is signaled.

Moreover, according to a specific embodiment, the base station 110 may update this number in each downlink assignment. The mobile terminal 120 assumes that the number may be updated and that it in each downlink subframe receives the minimum number so far. The terminal thus uses the number signaled in the last received and detected downlink assignment to determine if it missed (failed to detect) on or more downlink assignments sent within the bundling window.

In some embodiments the transmitted knowledge is slightly different, wherein the transmitted minimum total number of downlink assignments that the mobile terminal 120, will be assigned within the current bundling window is represented by the minimum total number in addition to the current one transmitted, i.e. the minimum number minus one. The mobile terminal 120 will then know that the expected minimum number of data packets within the bundling window is the signalled number in addition to the current one received. Also in these embodiments, the base station 110 may update this number in each downlink assignment.

The signaled knowledge about the minimum total number of downlink assignments may in some embodiments be represented by the knowledge about the number of previous signalled downlink assignments and current knowledge about the minimum number of future downlink assignments within the bundling window in addition to the current one transmitted. Signalling scheme diagrams for signalling the number of downlink assignments sent during a bundling window according to this embodiment are depicted in FIG. 3. In the diagrams, the bundling window comprises four downlink subframes. In each tuple of four subframes, the left-most subframe is sent first and the right-most subframe is sent last. Boxes with a figure within indicate subframes in which downlink data (i.e. downlink assignment and transport block) is sent to the terminal. Blank boxes indicate subframes in which no downlink data is sent to the terminal. Numbers in the boxes with figures are the numbers sent to the mobile terminal 120 comprising information about the number of downlink assignments sent within the bundling window.

Each row illustrates a different case, and the three columns show what information is sent when using the three schemes.

In the first column representing the first scheme, the number of previously assigned subframes within the bundling window is signalled;

In the second column representing the second scheme, the minimum total number of assignments within the bundling window is signalled, and;

In the third column representing the third scheme, the sum of previously and minimum total number of future assignments within the bundling window is signalled.

For all schemes, the current assignment is not accounted for in the summation.

In some embodiments the mobile terminal 120 may indicate to the base station 110 which was the last received downlink assignment. Alternatively, if the base station 110 knows from the beginning what the number of assignments will be, it may signal this number in each end every subframe (possibly minus 1) which corresponds to the second scheme.

Figure 4:
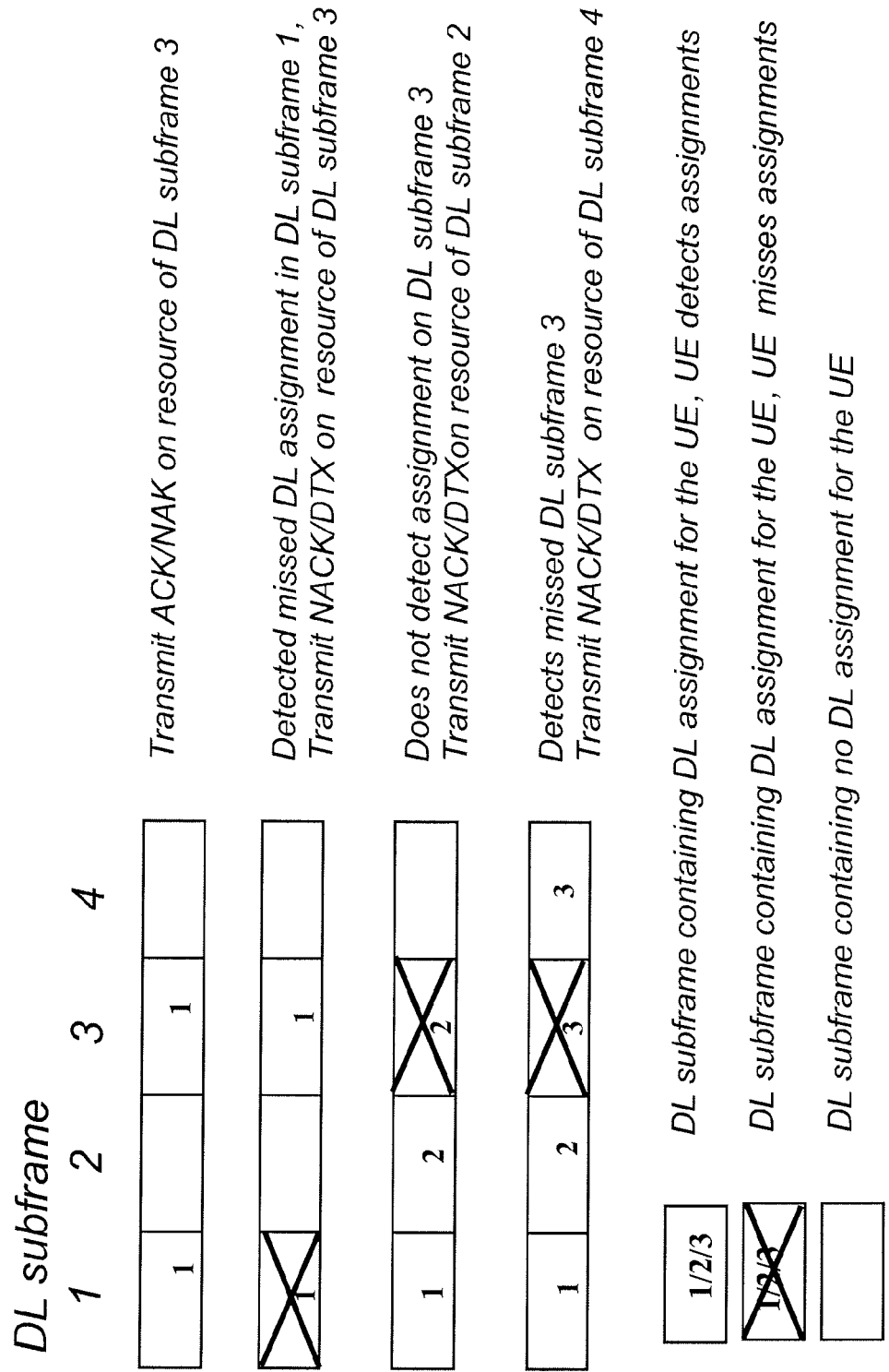
FIG. 4 is a schematic block diagram illustrating embodiments of signalling.

The mobile terminal 120 will attempt to decode the received downlink assignments in each downlink subframe, and can hence keep track of the number of detected downlink assignments during a bundling window. For each downlink subframe in which it receives a downlink assignment, it may increase a counter counting how many downlink assignments it has received. The mobile terminal 120 may further compare its counter of received downlink assignments to the signaled value of last downlink assignment, (plus 1 for the embodiments where the minimum total number minus one was signalled). In this way, the mobile terminal 120 may detect if it has missed any downlink assignments. Likewise, if the last received downlink assignment in a bundling window indicated that another downlink assignment was to be sent but no further assignment was detected by the terminal during the bundling window, the terminal will conclude that it missed the final assignment within the bundling window. Examples illustrating how the mobile terminal 120 can detect that it has missed a downlink assignment are given in FIG. 4, more exactly, an illustration on how the mobile terminal can use the information about the minimum number of previous and future downlink assignments within a bundling window to detect missed downlink assignments. In the diagrams, the bundling window comprises four downlink subframes. In each tuple of four subframes, the left-most subframes are sent first and the right-most subframe is sent last.

In the first row example, the 2nd detected assignment indicates that one additional assignment (previous and/or future) was sent during the bundling window. Since the mobile terminal 120 did detect such a (previous) assignment, no assignments were missed.

In the second row the 2nd detected assignment indicates the same, but the mobile terminal 120 did not detect an additional assignment. Therefore it will be concluded by the end of the bundling window, that (at least) one assignment was missed.

In the third row the 2nd (and last) detected assignment indicated that two additional assignments (previous and/or future) were sent, and/or were going to be sent, during the bundling window. Since the mobile terminal 120 did only detect one additional (previous) assignment it will conclude, by the end of the bundling window, that it missed (at least) one assignment.

In the fourth row the terminal similarly detects that it missed (at least) one assignment.

In case of a missed assignment within a bundling window the mobile terminal 120 may take appropriate action, such as sending a NAK. An alternative is that the mobile terminal 120 does not send any report at all to the base station 110. The base station 110 may then detect that the terminal did not transmit any feedback at all and conclude that it missed one or more of its assignments.

Assuming that two bits are available for signaling information, the above schemes may manage a bundling window of size at most 4 DL subframes. Note that semi-persistent assignments, which are set up by higher layers and occur in the same downlink subframe repeatedly over many radio frames, are not counted in the scheme. It only counts the number of dynamically scheduled assignments within a bundling window.

According to some embodiments, with 1 bit signaling up to two subframes may be bundled, with 2 bits, up to 4 subframes may be bundled, with 3 bits, up to eight subframes may be bundled. Furthermore, the mobile terminal 120 will use this number as the minimum number of subframes to be bundled. For a limited number of bits, there is a limit on the maximum number that can be signaled, but this need not to prevent that the mobile terminal 120 may bundle even more subframes. To support the extreme 9DL:1UL asymmetry in LTE TDD, 3-4 bits are required, depending on whether up to eight or nine subframes may be assigned to a mobile terminal. This is different as compared to the other uplink/downlink configurations which require 2 bits.

To handle this kind of extreme asymmetry an alternative is to impose a constraint that all assigned downlink subframes are consecutive, and to use two bits to indicate one of the four possible alternatives:

1. The current subframe is the first assigned subframe within the bundling window, and the following subframe will also contain an assignment.

2. The current subframe is the last subframe assigned within the bundling window, and the preceding subframe contained an assignment.

3. The current subframe is neither the first, nor the last subframe. The preceding and following subframe contain assignments to the mobile terminal 120.

4. The current subframe is the first and the last subframe. Hence it is the only subframe.

Also for this scheme semi-persistent assignments are disregarded, so that the scheme refers to those downlink subframes within a bundling window that do not carry semi-persistent assignments.

Signalling of these four alternatives requires two bits, and for two bits to be sufficient while still avoiding any error case, the scheduling constraint imposed is that only consecutive subframes can be assigned. It may also be possible to override for example signaling of alternative 2 or 4 and signal another downlink subframe indicating alternative 2. There may then be an error case in case the terminal misses this last downlink assignment. See FIG. 5.

In one embodiment, the interpretation of the two signaling bits depends on the allocation of subframes to uplink/downlink which may be broadcasted to all the terminals.

There are several ways to signal and update the number of assigned bundles in a certain subframe. Bits may be added to the Downlink Control Information (DCI) which is signaled on the Physical Downlink Control Channel (PDCCH). Another possibility is to employ scrambling of the Cyclic Redundancy Check (CRC) of the PDCCH. A combination of bits on the PDCCH and CRC scrambling may also be used.

Another possibility may be to combine fast dynamic signaling of an index in each downlink subframe and to e.g. employ higher layer signaling to configure a look-up table such as e.g. a codebook that can be used to map the signaled index to the actual number of subframes to be bundled. Assume that a single bit is signaled in the downlink assignment in each downlink subframe, either in the form of an explicit bit on the PDCCH or by means of CRC scrambling. The meaning of this bit may then be configured by higher layer signaling. As an example, if the bit is zero, it may be interpreted as zero subframes in addition to the current subframe and if the bit is one, it may be interpreted as for example 3. This would make it possible to switch between assigning a single downlink subframe within the bundling window and four subframes within the bundling window.

Another case may be to have two bits, and four alternatives, and let alternatives be configurable by higher layers so that 00 means 0 assigned downlink subframes (excluding present subframe)

01 means 2 assigned downlink subframes (excluding present subframe)

10 means 4 assigned downlink subframes (excluding present subframe)

11 means 8 assigned downlink subframes (excluding present subframe)

In summary, frequent signaling in each downlink subframe of an index in combination with higher layer less frequent signaling of how to interpret the signaling bits. This makes it possible to adjust the granularity and maximum number of resource that is possible to assign to a single mobile terminal during a set of downlink subframes. The base station 110 may be based on the number of users served adjust the assignment of subframes. For example, if a large number of mobile terminal users are served, less subframes needs to be assigned to a mobile terminal user whereas for a small number of mobile terminal users, more subframes can be assigned to each of the mobile terminal user.

According to some embodiments, the mobile terminal 120 shall upon detection of a Physical Downlink Shared Channel (PDSCH) transmission in subframe n intended for the mobile terminal 120, and for which an ACK/NACK shall be provided, transmit the ACK/NACK response in uplink subframe n+k, with k>3.

According to some embodiments for TDD, the use of a single ACK/NACK response for providing HARQ feedback for multiple PDSCH transmissions is supported by performing logical AND of all the corresponding individual PDSCH transmission ACK/NACKs. The mobile terminal 120 shall in this embodiment use the Downlink Assignment Index, which denotes a counter of the minimum number of previous and future dynamic downlink assignment transmitted within the set, from the last detected DCI format 1A/1/2 to check for missed DCI and shall not transmit ACK/NACK when any DCI is missed. Here the minimum total number of data packets within the bundling window is represented by the previous and future dynamic downlink assignment. (AND is the logical AND operation.)

Figure 6:
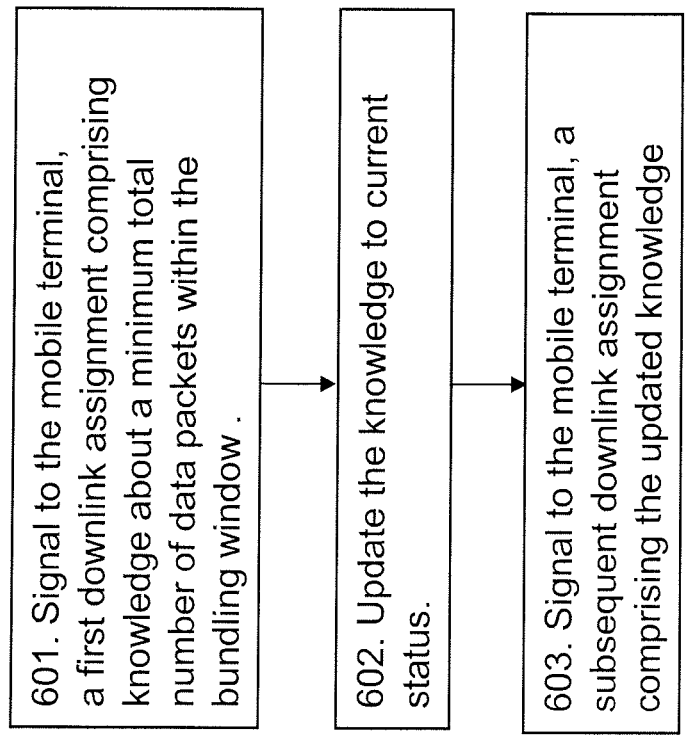
FIG. 6 is a flow chart illustrating embodiments of a method in a base station.

The method steps in the base station 110 for sending a data packet to the mobile terminal 120 using a current bundling window for transmitting data packets in subframes of a radio channel, according to some embodiments will now be described with reference to a flowchart depicted in FIG. 6. The bundling window comprises a number of data packets, already transmitted or to be transmitted to the mobile terminal 120. The data packets are to be confirmed by the mobile terminal 120. The method comprising the steps of:

601. In a first subframe the base station 110 signals to the mobile terminal 120, a first downlink assignment of a first data packet of the bundling window. The downlink assignment comprises knowledge, i.e. information, about a minimum total number of data packets within the bundling window that are scheduled to be transmitted to the mobile terminal 120.

602. This is an optional step. After the step of transmitting the first data packet the base station 110 may update the knowledge to current status.

603. In a subsequent subframe the base station 110 signals to the mobile terminal, a subsequent downlink assignment of a subsequent data packet of the bundling window, which downlink assignment comprises the updated knowledge.

In some embodiments the knowledge about the minimum total number of data packets is represented by the knowledge about the number of previous scheduling data packets, knowledge about the minimum number of future scheduling data packets within the bundling window, and knowledge about the first data packet currently being assigned.

In some embodiments the knowledge about the minimum total number of data packets is represented by the knowledge that the current signalled downlink assignment is the first, last, first and last, or neither first nor last downlink assignment.

According to a specific embodiment, the steps 601 and 603 of signalling the minimum total number of data packets within the bundling window in a certain subframe is performed by adding the number to the DCI which is signalled on a PDCCH.

As an alternative, the steps 601 and 603 of signalling the minimum total number of data packets within the bundling window in a certain subframe may be performed by employing scrambling of a CRC of the PDCCH.

As a further alternative, the steps 601 and 603 of signalling the minimum total number of data packets within the bundling window in a certain subframe is performed by employing a combination of bits on a PDCCH and CRC scrambling.

According to some embodiments, the steps of signalling the minimum total number of data packets within the bundling window in a certain subframe is performed by signalling of an index in the downlink subframe. In these embodiments higher layer signalling may be employed to configure look-up table for mapping the signalled index to the actual minimum total number of data packets within the bundling window.

After receiving the knowledge, the mobile terminal 120 is able to establish whether any data packet being scheduled in the bundling window and being sent from the base station 110 is correctly received or missed. The mobile terminal 120 may then send an acknowledgement or non-acknowledgement to the base station 110 accordingly. If any data packet is missed and a non-acknowledgement is sent to the base station 110, the base station 110 may retransmit the missed data packet.

Figure 7:
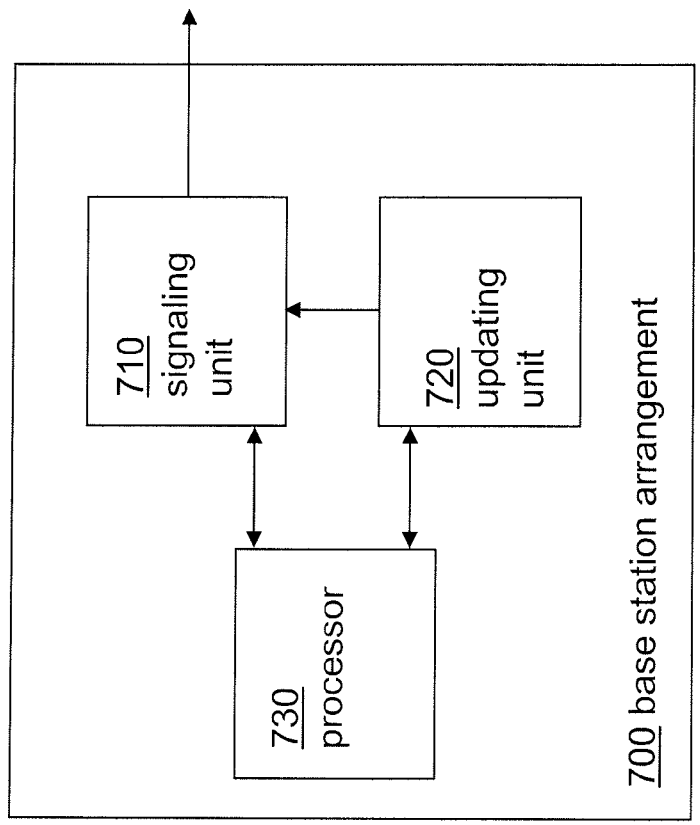
FIG. 7 is a schematic block diagram illustrating embodiments of a base station arrangement.

To perform the method steps above to sending a data packet to a mobile terminal 120 the base station 110 comprises an arrangement 700 depicted in FIG. 7. The base station 110 is configured to use a current bundling window for transmitting data packets in subframes of a radio channel. The bundling window comprises a number of data packets, already transmitted or to be transmitted to the mobile terminal 120, which data packets are configured to be confirmed by the mobile terminal 120.

The base station arrangement 700 comprises a signalling unit 710 configured to signal to the mobile terminal 120 in a first subframe, a first downlink assignment of a first data packet of the bundling window. The downlink assignment comprises knowledge about a minimum total number of data packets within the bundling window that is scheduled to be transmitted to the mobile terminal 120.

The base station arrangement 700 may further comprise an updating unit 720 configured to update the knowledge to current status.

The signalling unit 710 may further be configured to, in a subsequent subframe, signalling to the mobile terminal, a subsequent downlink assignment of a subsequent data packet of the bundling window. The downlink assignment comprises the updated knowledge.

According to some embodiments the knowledge about the minimum total number of data packets is represented by the knowledge about the number of previous scheduling data packets, knowledge about the minimum number of future scheduling data packets within the bundling window, and knowledge about the first data packet currently being assigned.

According to some embodiments the knowledge about the minimum total number of data packets is represented by the knowledge that the current signalled downlink assignment is the first, last, first and last, or neither first nor last downlink assignment.

According to some further embodiments the signalling unit 710 is further configured to signal the minimum total number of data packets within the bundling window in a certain subframe by adding the number to the DCI which is signalled on a PDCCH.

In an alternative embodiment the signalling unit 710 is configured to signal the minimum total number of data packets within the bundling window in a certain subframe by employing scrambling of a CRC of the PDCCH.

In another alternative embodiment the signalling unit 710 is configured to signal the minimum total number of data packets within the bundling window in a certain subframe by employing a combination of bits on a PDCCH and CRC scrambling.

In yet another alternative embodiment the signalling unit 710 is configured to signal the minimum total number of data packets within the bundling window in a certain subframe is performed by signalling of an index in the downlink subframe. Higher layer signalling may be employed to configure look-up table for mapping the signalled index to the actual minimum total number of data packets within the bundling window.

The method steps in the mobile terminal 120, for receiving a data packet from the base station 110 according to some embodiments will now be described with reference to a flowchart depicted in FIG. 8. As mentioned above the base station 110 uses a current bundling window for transmitting data packets. The bundling window comprises a number of data packets, transmitted or to be transmitted to the mobile terminal 120. The data packets are to be confirmed by the mobile terminal 120. The method comprises the steps of:

801. The mobile terminal 120 receives in a first subframe, a signal from the base station 100. The signal comprises a first downlink assignment of a first data packet of the bundling window. The downlink assignment comprises knowledge, i.e. information about a minimum total number of data packets within the bundling window that are scheduled to be transmitted to the mobile terminal 120.

802. The mobile terminal 120 decodes the first subframe.

803. The mobile terminal establishes whether any data packet being scheduled in the bundling window and being sent from the base station 110 before the first downlink assignment, has been missed. The establishment is based on the received knowledge.

804. This step is optional. The mobile terminal 120 receives in a subsequent subframe, a signal from the base station 100. The signal comprises a subsequent downlink assignment of a subsequent data packet of the bundling window. The downlink assignment comprises the updated knowledge, being updated by the base station 110 to current status.

805. This step is optional. The mobile terminal 120 decodes the subsequent subframe.

806. This step is also optional. Based on the received updated knowledge, the mobile terminal 120 establishes weather any data packet being scheduled in the bundling window and being sent from the base station 110 before the subsequent downlink assignment has been missed.

In a specific embodiment the knowledge about the minimum total number of data packets is represented by the knowledge about the number of previous scheduling data packets, knowledge about the minimum number of future scheduling data packets within the bundling window, and knowledge about the first data packet currently being assigned.

In an alternative embodiment, the knowledge about the minimum total number of data packets is represented by the knowledge that the current received downlink assignment is the first, last, first and last, or neither first nor last downlink assignment.

According to a specific embodiment, the steps 801 and 804 of receiving the minimum total number of data packets within the bundling window in a certain subframe is represented by the number being adding to the DCI which is received on a PDCCH.

According to an alternative embodiment, a scrambled CRC of the PDCCH has been employed in the steps 801 and 804 of receiving the minimum total number of data packets within the bundling window in a certain subframe.

According to a further alternative embodiment a combination of bits on a PDCCH and CRC scrambling is employed in the steps 801 and 804 of receiving the minimum total number of data packets within the bundling window in a certain subframe.

In some embodiments, the steps 801 and 804 of receiving the minimum total number of data packets within the bundling window in a certain subframe are performed by signalling of an index in the downlink subframe. The index is associated to the minimum total number of data packets within the bundling window. Higher layer signalling may be employed to configure look-up table for mapping the signalled index to the actual minimum total number of data packets within the bundling window.

After the mobile terminal 120 has established whether any data packet being scheduled in the bundling window and being sent from the base station 110 is correctly received or missed, the mobile terminal 120 may send an acknowledgement or non-acknowledgement to the base station 110 accordingly. If any data packet is missed and an non-acknowledgement is sent to the base station, the base station 110 may retransmit the data packet.

To perform the method steps above for receiving a data packet from a base station 110, the mobile terminal 120 comprises an arrangement 900 depicted in FIG. 9. As mentioned above the base station 110 is configured to use a current bundling window for transmitting data packets. The bundling window comprises a number of data packets, transmitted or to be transmitted to the mobile terminal 120, which data packets are to be confirmed by the mobile terminal 120.

The mobile terminal arrangement 900 comprises a receiving unit 910 configured to receive in a first subframe, a signal from the base station 100. The signal comprises a first downlink assignment of a first data packet of the bundling window. The downlink assignment comprises knowledge about a minimum total number of data packets within the bundling window that are scheduled to be transmitted to the mobile terminal 120.

The mobile terminal arrangement 900 comprises a decoding unit 920 configured to decode the first subframe.

The mobile terminal arrangement 900 further comprises an establishing unit 930 configured to establish whether any data packet being scheduled in the bundling window and being sent from the base station 110 before the first downlink assignment has been missed. The establishment is based on the received updated knowledge.

The receiving unit 910 may further be configured to receive in a subsequent subframe, a signal from the base station 100. The signal comprises a subsequent downlink assignment of a subsequent data packet of the bundling window. The downlink assignment comprises the updated knowledge, being updated by the base station 110 to current status.

The decoding unit 920 may further be configured to decode the subsequent subframe.

The establishing unit 930 may further be configured to establish whether any data packet being scheduled in the bundling window and being sent from the base station 110 before the subsequent downlink assignment has been missed. The establishment is based on the received updated knowledge.

According to some embodiments the knowledge about the minimum total number of data packets is represented by the knowledge about the number of previous scheduling data packets, knowledge about the minimum number of future scheduling data packets within the bundling window, and knowledge about the first data packet currently being assigned.

According to some embodiments the knowledge about the minimum total number of data packets is represented by the knowledge that the current signalled downlink assignment is the first, last, first and last, or neither first nor last downlink assignment.

According to a specific embodiment, the receiving unit 910 is further configured to receive the minimum total number of data packets within the bundling window in a certain subframe by adding the number to the DCI which is received on a PDCCH.

According to an alternative embodiment the receiving unit 910 is further configured to receive the minimum total number of data packets within the bundling window in a certain subframe wherein a scrambled CRC of the PDCCH has been employed.

According to an alternative embodiment the receiving unit 910 is further configured to receive the minimum total number of data packets within the bundling window in a certain subframe wherein a combination of bits on a PDCCH and CRC scrambling has been employed.

In some embodiments the receiving unit 910 is further configured to receive the minimum total number of data packets within the bundling window in a certain subframe by receiving an index in the downlink subframe. The index is associated to the minimum total number of data packets within the bundling window. Higher layer signalling may be employed to configure look-up table for mapping the signalled index to the actual minimum total number of data packets within the bundling window.

The present mechanism for above for sending or receiving a data packet, may be implemented through one or more processors, such as a processor 730 in the base station arrangement 700 depicted in FIG. 7 or the processor 940 in the mobile terminal arrangement 900 depicted in FIG. 9, together with computer program code for performing the functions of the present solution. The program code mentioned above may also be provided as a computer program product, for instance in the form of a data carrier carrying computer program code for performing the present solution when being loaded into the base station 110 or the mobile terminal 120. One such carrier may be in the form of a CD ROM disc. It is however feasible with other data carriers such as a memory stick. The computer program code can furthermore be provided as pure program code on a server and downloaded to the base station 110 or the mobile terminal 120 remotely.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method for sending a data packet from a base station to a mobile terminal, comprising;
   signalling to the mobile terminal, in a first subframe of a radio channel, a downlink assignment of a first data packet of a bundling window, wherein the bundling window comprises a number of data packets, already transmitted or to be transmitted to the mobile terminal, that are to be confirmed by the mobile terminal and wherein the downlink assignment comprises information about a minimum total number of data packets within the bundling window that are scheduled to be transmitted to the mobile terminal including information about a number of previous scheduled data packets, information about a minimum number of future scheduling data packets within the bundling window and information about the first data packet currently being assigned; and
   transmitting data packets from the base station in subframes of the radio channel using the bundling window.

2. The method of claim 1, further comprising:
   after transmitting the first data packet, updating the information based on a current status; and
   in a subsequent subframe, signalling to the mobile terminal a subsequent downlink assignment of a subsequent data packet of the bundling window, wherein the subsequent downlink assignment comprises updated information.

3. The method of claim 1, wherein the information about the minimum total number of the data packets further comprises an indication that the downlink assignment is a first, a last, the first and the last, or neither the first nor the last downlink assignment.

4. The method of claim 1, wherein signalling the information about the minimum total number of the data packets within the bundling window in a certain subframe comprises adding the minimum total number to the Downlink Control Information (DCI) which is signalled on a Physical Downlink Control Channel (PDCCH).

5. The method of claim 1, wherein signalling the information about the minimum total number of the data packets within the bundling window in a certain subframe comprises employing scrambling of a Cyclic Redundancy Check (CRC) of a Physical Downlink Control Channel (PDCCH).

6. The method of claim 1, wherein signalling the information about the minimum total number of the data packets within the bundling window in a certain subframe comprises signalling the information by employing a combination of bits on a Physical Downlink Control Channel (PDCCH) and a Cyclic Redundancy Check (CRC) scrambling.

7. The method of claim 1, wherein signalling the information about the minimum total number of the data packets within the bundling window in a certain subframe comprises signalling an index in the first subframe.

8. The method of claim 7, further comprising configuring a look-up table for mapping the index to the minimum total number of the data packets within the bundling window using higher layer signalling.

9. A method for receiving a data packet from a base station at a mobile terminal, wherein the base station uses a bundling window for transmitting data packets, and wherein the bundling window comprises a number of data packets, transmitted or to be transmitted to the mobile terminal, the method comprising the steps of:
   receiving in a first subframe, a signal from the base station, the signal comprising a downlink assignment of a first data packet of the bundling window, wherein the downlink assignment comprises information about a minimum total number of the data packets within the bundling window that are scheduled to be transmitted to the mobile terminal;
   obtaining the information about the minimum total number of the data packets by decoding the first subframe;
   confirming for the base station the data packets received within the bundling window; and
   based on the information, establishing whether any data packet being scheduled in the bundling window and being sent from the base station before the downlink assignment, has been missed.

10. The method of claim 9, further comprising:
   receiving in a subsequent subframe, a signal from the base station, the signal comprising a subsequent downlink assignment of a subsequent data packet of the bundling window, wherein the subsequent downlink assignment comprises updated information about the minimum total number of the data packets within the bundling window that are scheduled to be transmitted to the mobile terminal that has been updated based on a current status;
   obtaining the updated information by decoding the subsequent subframe; and
   based on the updated information, establishing whether any data packet being scheduled in the bundling window and being sent from the base station before the subsequent downlink assignment has been missed.

11. The method of claim 9, wherein the information about the minimum total number of the data packets comprises information about a number of previous scheduling data packets, information about a minimum number of future scheduling data packets within the bundling window, and information about the first data packet currently being assigned.

12. The method of claim 9, wherein the information about the minimum total number of the data packets comprises information indicating that the downlink assignment is a first, a last, the first and the last, or neither the first nor the last downlink assignment.

13. The method of claim 9, wherein the information about the minimum total number of the data packets within the bundling window in a certain subframe comprises a number being added to the Downlink Control Information (DCI) that is received on a Physical Downlink Control Channel (PDCCH).

14. The method of claim 9, wherein receiving the minimum total number of the data packets within the bundling window in a certain subframe comprises employing a scrambled Cyclic Redundancy Check (CRC) of a Physical Downlink Control Channel (PDCCH).

15. The method of claim 9, wherein receiving the information about the minimum total number of the data packets within the bundling window in a certain subframe comprises receiving a combination of bits on a Physical Downlink Control Channel (PDCCH) and employing CRC scrambling.

16. The method of claim 9, wherein receiving the minimum total number of the data packets within the bundling window in a certain subframe comprises receiving an index in the first subframe, wherein the index is associated with the minimum total number of the data packets within the bundling window.

17. The method according to claim 16, further comprising configuring a look-up table for mapping the index to the minimum total number of the data packets within the bundling window based on higher layer signalling.

18. An apparatus in a base station for sending a data packet to a mobile terminal, the base station being configured to use a current bundling window for transmitting data packets in subframes of a radio channel, wherein the bundling window comprises a number of data packets, already transmitted or to be transmitted to the mobile terminal, and wherein the data packets are to be confirmed by the mobile terminal, the base station comprising:
a signalling unit configured to signal to the mobile terminal, in a first subframe, a downlink assignment of a first data packet of the bundling window, wherein the downlink assignment comprises information about a minimum total number of the data packets within the bundling window that are scheduled to be transmitted to the mobile terminal including information about a number of previous scheduled data packets, information about a minimum number of future scheduling data packets within the bundling window and information about the first data packet currently being assigned.

19. An apparatus in a mobile terminal for receiving a data packet from a base station, the base station being operable to use a current bundling window for transmitting data packets, wherein the bundling window comprises a number of data packets, transmitted or to be transmitted to the mobile terminal, and to be confirmed by the mobile terminal, the mobile terminal comprising:
a receiving unit configured to receive a signal from the base station in a first subframe, the signal comprising a downlink assignment of a first data packet of the bundling window, wherein the downlink assignment comprises information about a minimum total number of the data packets within the bundling window that are scheduled to be transmitted to the mobile terminal;
a decoding unit configured to decode the first subframe to obtain the information about the minimum total number of the data packets; and
an establishing unit configured to establish whether any data packet being scheduled in the bundling window and being sent from the base station before the downlink assignment has been missed.

* * * * *